Oct. 4, 1960 E. DE LAGABBE 2,954,943
AIRCRAFT WITH SLIPSTREAM DEFLECTING WING FLAPS
Filed Nov. 9, 1956 6 Sheets-Sheet 1

INVENTOR:
Edmond De Lagabbe
BY: Michael S. Striker
agt.

INVENTOR:
Edmond De Lagabbe
BY: Michael S. Striker
Agt.

Oct. 4, 1960  E. DE LAGABBE  2,954,943
AIRCRAFT WITH SLIPSTREAM DEFLECTING WING FLAPS
Filed Nov. 9, 1956  6 Sheets-Sheet 3

INVENTOR:
Edmond De Lagabbe
BY: Michael S. Striker
Agt.

Oct. 4, 1960            E. DE LAGABBE            2,954,943
AIRCRAFT WITH SLIPSTREAM DEFLECTING WING FLAPS
Filed Nov. 9, 1956                                6 Sheets-Sheet 5

INVENTOR:
Edmond De Lagabbe
BY: Michael S. Striker
Agt.

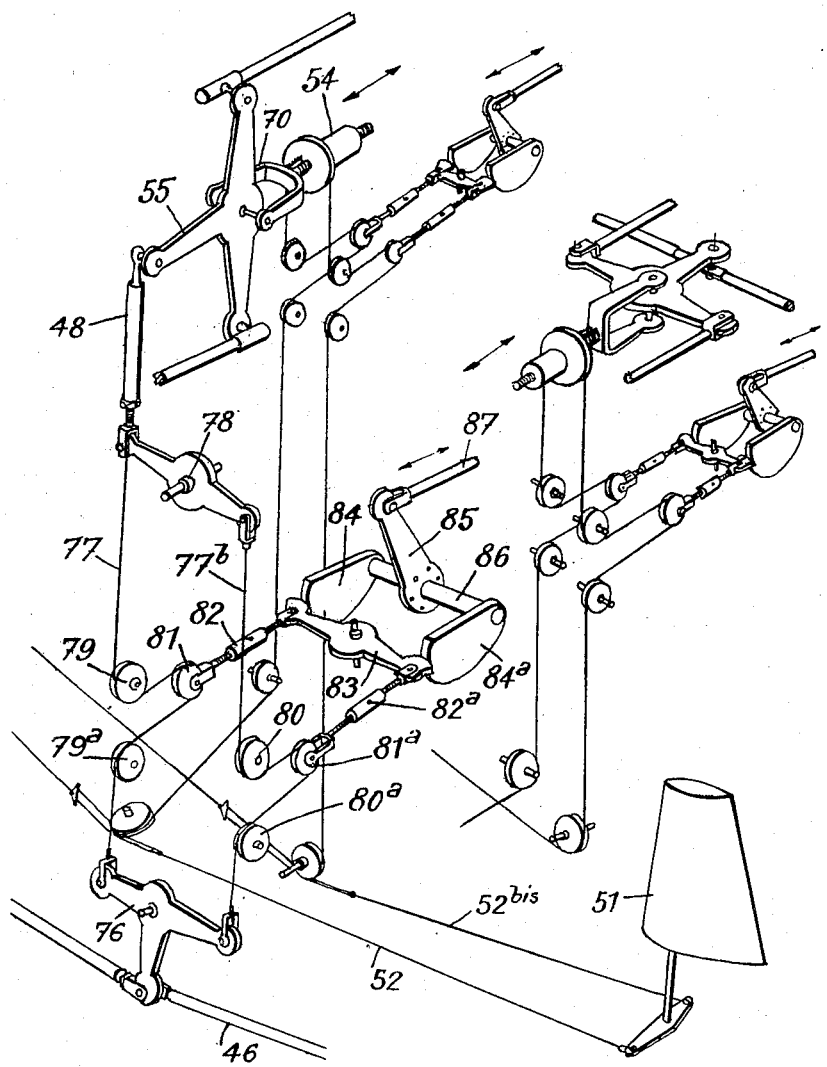

United States Patent Office 2,954,943
Patented Oct. 4, 1960

2,954,943

AIRCRAFT WITH SLIPSTREAM DEFLECTING WING FLAPS

Edmond De Lagabbe, Paris, France, assignor to Societe Anonyme des Ateliers d'Aviation Louis Breguet, Paris, France Filed Nov. 9, 1956, Ser. No. 621,387

9 Claims. (Cl. 244—12)

The invention relates to powered heavier-than-air aircraft, of the kind in which the lift of a fixed wing system is supplemented by the downward component of propeller thrust in such a way as to make the aircraft capable of hovering or of very slow speed flight.

More particularly, in aircraft of the class to which the invention relates the fixed wing system, which is provided with lift-increasing means such as adjustable flaps, is immersed in the propeller slipstream, which may be deflected downwardly, as pointed out below.

Figure 1 of the accompanying drawings illustrates schematically, in side elevation, an aircraft of the type above referred to, and in other respects of conventional configuration, together with a superimposed force diagram.

In this figure, the flapped fixed wing 2 is immersed in the slipstream of propellers 3, whose thrust vector 4 passing through the center of gravity 1, can be resolved into vertical and horizontal components 5, 6. The resultant reaction 7 of the aerodynamic forces on the wing 2 is likewise resolvable into vertical and horizontal components 8, 9. Equilibrium is attained when the sum of the vertical forces 5 and 8 balances the weight 10 and the horizontal thrust component 6 and the drag 9 are equal and opposite. The slipstream leaves the propellers in the direction of arrows 11 and is deflected by the wing system into a vertically downward direction indicated by arrows 13, and in this condition the aircraft hovers. If forward motion is initiated, e.g. by increasing the airscrew thrust, the angle of attack of the wing system is decreased, since the local wind is now compounded of the slipstream 11 and the relative wind due to the forward translation; and, since flapped wings in general have an unstable pitching moment coefficient curve, the center of pressure will move forward producing a nose-up pitching moment on the aircraft. Similarly if the aircraft starts to move backwards, a nose-down pitching moment will arise, but, since the empennage 12 is outside the slipstream, it is ineffective until substantial forward speed is attained. Consequently, the system as a whole is unstable in pitch in hovering and slow speed flight conditions. Moreover in these conditions the system has little or no inherent stability in roll and yaw and is substantially uncontrollable in roll and yaw by the control surfaces of the empennage (though some control may be obtained by ailerons or spoilers immersed in the slipstream).

The general object of the present invention is to render an aircraft of this type capable of equilibrium and controllable about all axes, in all conditions of flight from hovering or vertical ascent up to a horizontal forward speed at which the conventional stabilizing means and controls become effective, by introducing appropriate modifications and additional features. It is to be understood that such modifications and additional features may also be incorporated in aeroplanes of a more conventional type, with the object of extending the speed range at the low-speed end; and they may also be applied to tailless aircraft.

More especially, an object of the invention is to render an aeroplane (or more generally an aerodyne having a fixed lifting wing system) capable of equilibrium and controllable about all axes in conditions in which a conventional empennage and associated control surfaces are ineffective, without affecting the action of the propeller-slipstream in augmenting the virtual lift-coefficient of the fixed wing system, or part thereof, immersed in it.

Figures 2 to 8 of the accompanying drawings illustrate, by way of example only, specific embodiments of the invention. Of these figures, Figure 2 is a schematic side elevation of an aircraft embodying the invention, with superimposed force-diagram.

Figure 8 is a fragmentary schematic illustration of a structure for disconnecting the controls of the invention when desired.

Figure 2:
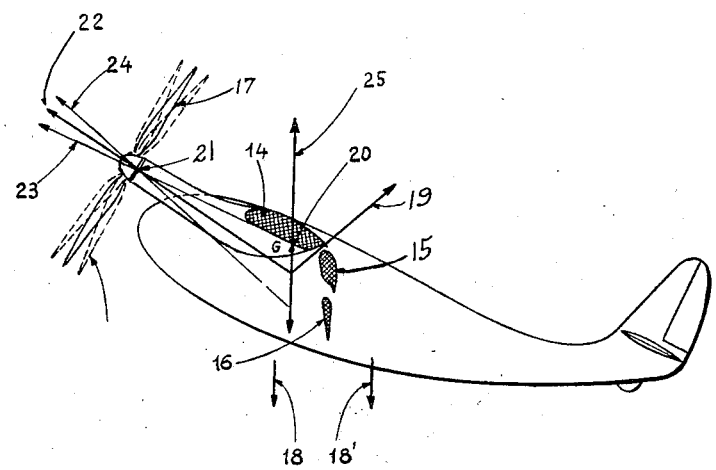

The aircraft illustrated in Figure 2 comprises a body B carrying a conventional empennage 12 and a fixed lifting wing 14 provided with lift increasing slotted flaps 15, 16 shown in the deflected position. Symmetrically placed on either side of the body are two similar counter-rotative propellers 17 of which one only is shown in Figure 2. The axis of such propeller can be controllably inclined about an articulation 21, whose axis is parallel to the pitching axis of the aircraft and situated in advance of the aircraft center of gravity 20 by a distance greater than 80% of the mean chord of the wing 14. The latter is in the "high-wing" position to provide adequate ground clearance for the large-diameter propellers 17 and the wide-chord flap system 15, 16 and lies above the C.G. 20, which is situated not more than 40% of the mean chord aft of the leading edge of the wing in accordance with normal practice.

The fixed wing 14 and flaps 15, 16 are immersed in the slipstream of the propellers 17, so that the slipstream is thereby deflected downwardly into the direction indicated by arrows 18, 18'.

Figure 1:
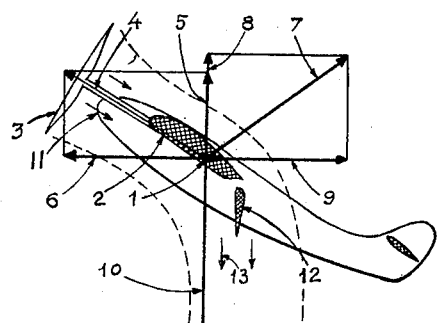

It will be convenient at this point to refer to the force diagram superimposed on Figure 2. As in Figure 1 the weight of the aircraft acting downwardly through the C.G. 20 is represented by a vector 10. The aerodynamic reaction of the wing system is represented by a vector 19 and the propeller thrust by a vector 22 (23, or 24) according to the inclination of the propeller axis in the pitching plane. The limiting positions of the propeller disc are shown in dotted lines and the corresponding positions of the thrust-vector are designated by 23 and 24. Within this range the angle of attack of the wing system with respect to the slipstream is positive and the C.G. 20 is contained within the sector defined by vectors 23 and 24.

22 designates an intermediate position of the thrust-vector corresponding to the full line representation of the propeller disc.

The forces 10, 19 and 22 are not necessarily in equilibrium, but will only be so when the resultant 25 of the vectors 22 and 19 passes through the C.G. 20 and is equal and opposite to the weight vector 10, as shown in Figure 2. Complete equilibrium is however of less practical importance than zero pitching moment, for which the condition is that the resultant vector 25 shall pass through the C.G. 20; and this can be achieved by suitably selecting the common inclination of the propeller discs in the pitching plane of the aircraft, provided the axis 21 about which the inclination takes place is well in advance of the C.G. It will further be seen from inspection of Figure 2 that inclination of the vector 22 towards vector 24 produces a nose-up pitching moment while opposite inclination of vector 22 produces a nose-down pitching moment.

Figure 3:
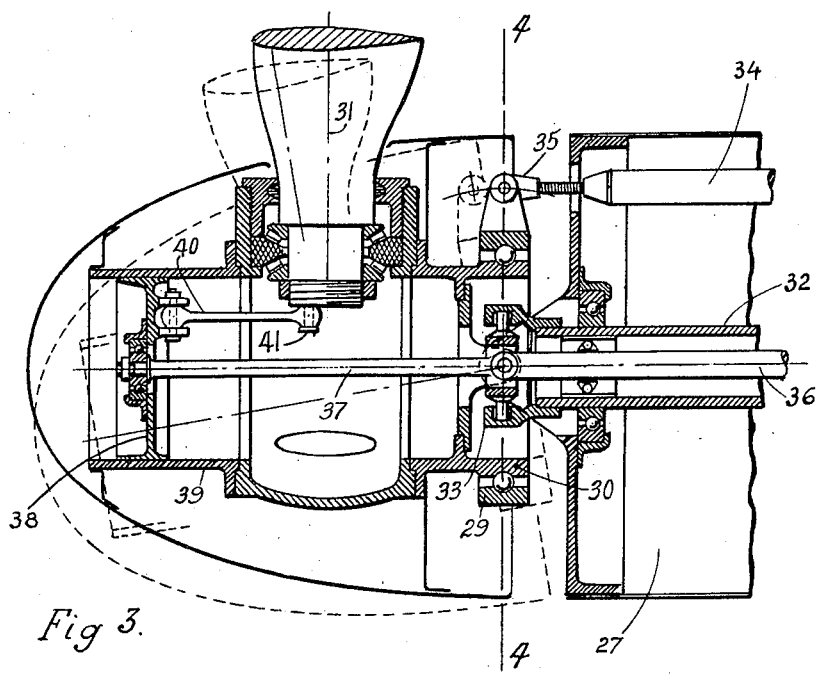
Figure 3 is an axial section of an airscrew and its mounting.
Figure 4:
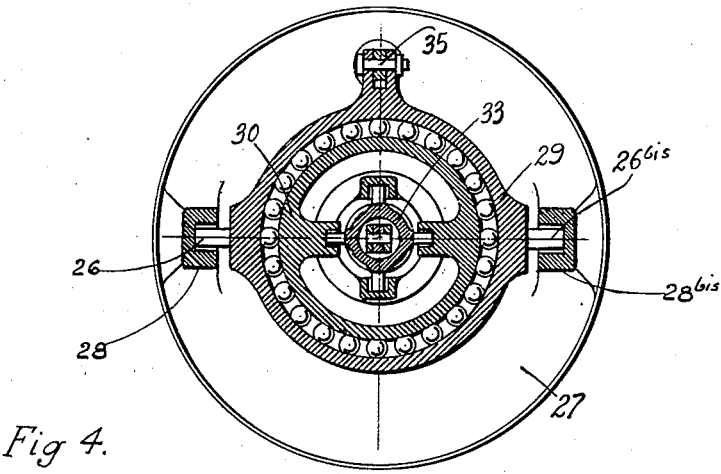
Figure 4 is a section on the line 4—4 of Figure 3.

Figures 3 and 4 illustrate schematically a propeller mounting, driving and controlling structure enabling the axis of a propeller, such as 17 in Figure 2, to be inclined relatively to the frame of the aircraft about an axis such as 21 (Figure 2) and providing for (collective) pitch variation of the propeller blades.

In these figures the propeller blades 31 are rotatably supported for pitch-variation by means of bearings in the hub 30, which is rotatably supported in a bearing ring 29. The latter has trunnions 26 rotatably supported in trunnion blocks 28 secured to a structure 27 fixed to the frame. Movement about the trunnions of the ring 29 and propeller 30, 31 is controlled by a rod 34 pivoted at 35 to ring 29.

The structure 27 also supports a bearing 32' in which is rotatable a hollow driving shaft 32 connected to the hub 30 by a universal joint 33 whose center lies on the axis of trunnions 26.

Pitch variation of the blades is provided by any conventional means housed in the hub, here represented by a cylinder 39 in which slides a piston 38 connected by links 40 to eccentric pins 41 on the blade-roots. Control of the piston 38 is effected by means of a non-rotative push-pull rod 37 coaxial with the hub, here represented as being connected to piston 38 through a thrust-bearing; and rod 37 is connected to an extension rod 36, housed coaxially in the driving shaft 32, by means of a pivot joint 37' whose axis is parallel to that of the trunnions 26 and in its mean position coincides with the trunnion axis.

It will be seen that inclination of the propeller axis is achieved by axial movement of rod 34, as indicated in dotted lines in Figure 3; and pitch-variation by axial movement of rod 36.

It will be readily apparent to those skilled in the art that Figures 3 and 4 illustrate an ideal and simplified construction and are in fact schematic only; they will also recognize that in a practical construction many minor modifications of a purely structural kind may be called for. For instance, the bearing ring 29 will preferably be a massive, stiff component carrying at least two spaced hub-bearings, and the trunnion mounting 26, 28 will preferably incorporate anti-friction bearings. Furthermore, the simple Cardan joint 33 will in practice preferably be replaced by a homokinetic joint of a known type.

Alternative equivalents for various parts of the mechanism will also suggest themselves to those skilled in the art, such as hydraulic or electrical means for varying the blade-pitch, in which case the jointed rod 36, 37 may be eliminated and replaced by input and output pipes or leads, including the usual transfer glands or slip-rings for conveying the hydraulic fluid or current from the non-rotative bearing ring 29 to the rotative hub 30, and flexible connections between the tiltable bearing ring 29 and the frame of the aircraft.

Again, for tilting the propeller disc, instead of mounting the propeller assembly on trunnions for mechanical tilting, a propeller with flapping blades and cyclic pitch control of the type commonly adopted for helicopter rotors may be employed.

Figure 6:
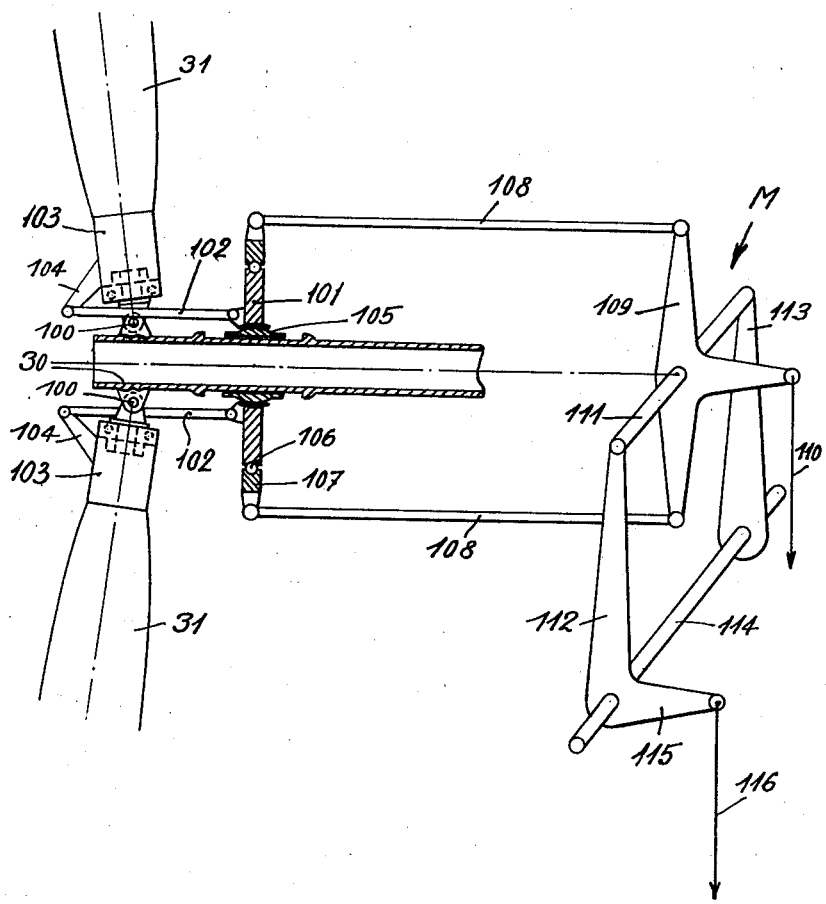
Figure 6 is a schematic view similar to Figure 3 illustrating a modified form of construction.

In Figure 6 the blades 31 are mounted on member 30 by means of "flapping" articulations 100, and the pitch of each blade is variable by means of a lever 104 and a link 102. The links 102 are connected to a swash-plate 101 mounted on member 30 by means of a ball-joint 105. The plate 101 carries a non-rotative ring 107 on a bearing 106. Ring 107 is connected by links 108 with opposed arms of a three-armed lever 109, whose third central arm is connected to a link 110. The lever 109 is pivotably mounted on a shaft 111 carried by the extremities of two parallel levers 112, 113, fixed to a common shaft 114. Lever 112 has a second arm 115 connected to a link 116.

Movement of link 116 to rotate levers 112, 113 causes the swash-plate 101 to be displaced bodily along the axis of member 30 and thereby varies the pitches of the blades 31 collectively, while movement of link 110 to rotate lever 109 rocks the swash-plate on its ball-joint support 105 and thereby causes the pitch of each blade to be varied cyclically. This cyclic pitch variation causes the blades to swing on their flapping articulations 100 in such a way that the swept disc of the propeller is inclined into a plane parallel to that of the swash-plate 101.

For the sake of simplicity and since the drawing is schematic only, the connections of the links 102 to the swash-plate 101 have been shown in the plane of the drawing, but in practice, to obtain the desired action, these connections must be in the plane at right angles to that of the drawing, as also must the connections of the links 102 to the levers 104.

Figure 5:
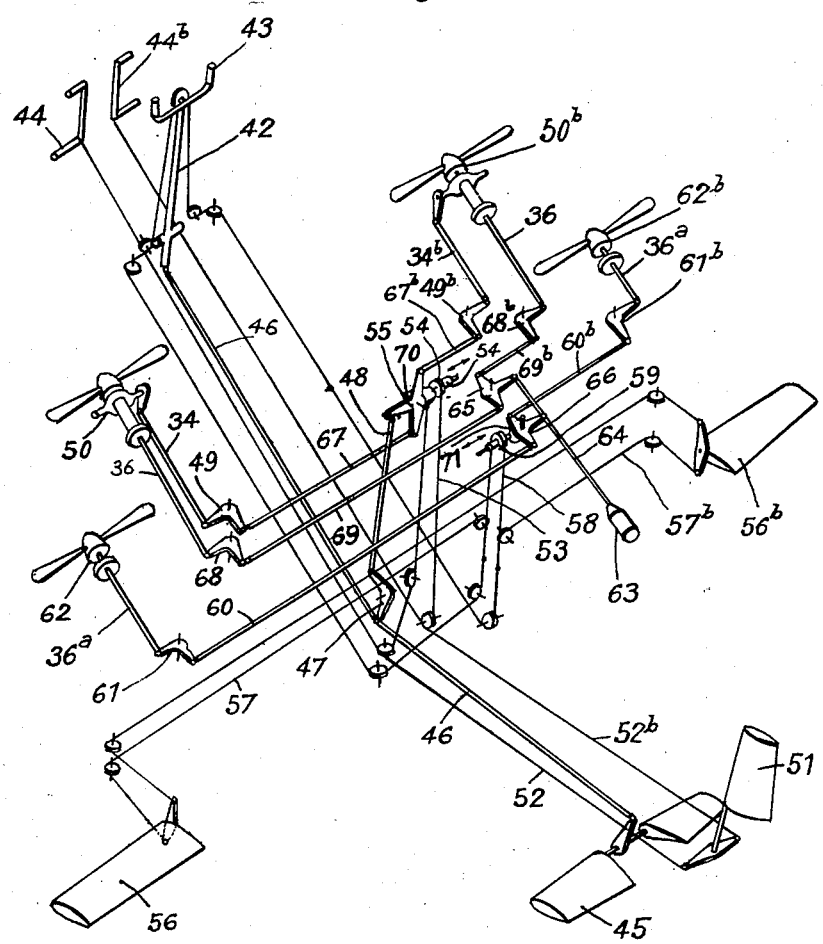
Figure 5 is a schematic representation in perspective of the aircraft's flying control circuits.

The control arrangements of a typical aircraft embodying the invention are illustrated in Figure 5. In this embodiment the aircraft has two pairs of symmetrically disposed propellers, viz: an inner pair 50, 50b, and an outer pair 62, 62b.

Mutually adjacent propellers, such as 50, 62 or 50b, 62b preferably rotate in opposite senses and have overlapping discs; their blades may be disposed so as to intermesh (when considered as projected on a common plane perpendicular to their axes).

The conventional controls (operative in high-speed and cruising flight) comprise a control column 42 rockable in the pitching plane of the aircraft and connected by a jointed push-pull linkage 46 with elevators 45, a "wheel" (actually a horned bar) 43 mounted on top of the column 42 for rocking in the rolling plane and connected by a cable circuit 57, 57b, with ailerons 56, 56b, and pedals 44, 44b, connected by cables 52, 52b with a rudder 51, the cable circuits being carries over pulleys as required.

The two inboard symmetrically disposed propellers 50, 50b, are mounted so that their discs can be tilted in the pitching plane of the aircraft, e.g. as illustrated in Figures 3 and 4, their inclination being controllable by push-pull rods 34, 34b; and the (collective) pitch of each of the four propellers is variable by means of push-pull rods 36 (for the inboard propellers) and 36a (for the outboard propellers).

The rods 34, 34b are connected by bell-cranks 49, 49b and push-pull links 67, 67b to one arm of a bell-crank 55, whose other arm is connected by a push-pull link 48 and bell-crank 47 to the linkage 46.

The rods 36 are connected by bell-cranks 68, 68b and links 69, 69b to opposite arms of a three-armed bell-crank 65; and the rods 36a are similarly connected by bell-cranks 61, 61b and links 60, 60b to opposite arms of a three-armed bell-crank 66. The central arms of bell-cranks 65, 66 are linked together and connected by a rod 64 with the piston of a hydraulic jack 63, remotely controlled by an independent control member (not illustrated). The control means of the jack 63 are omitted from the drawing for clarity since they may be of any suitable type known to those skilled in the art.

Figure 7:
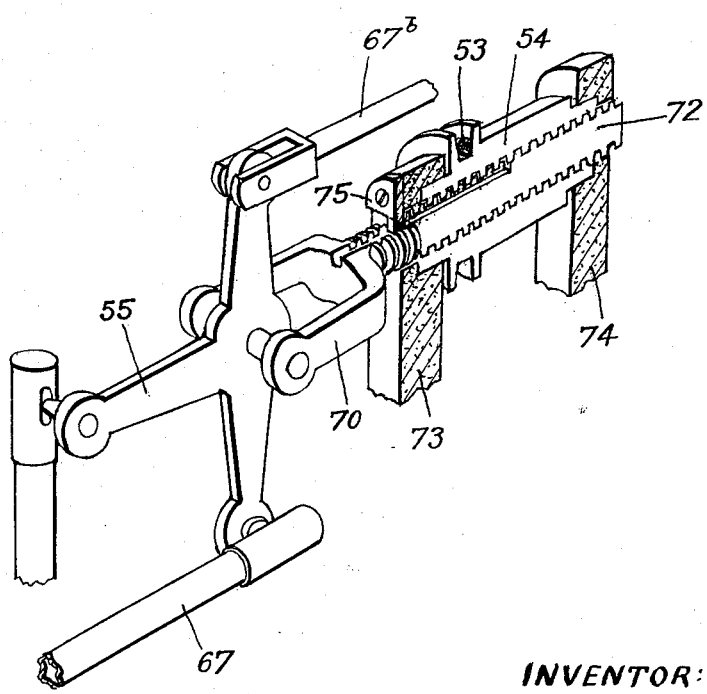
Figure 7 shows part of the structure of Figure 5 on an enlarged scale.

As shown in the Figures 5 and 7, the three arm lever 55 is mounted for rotation about its central axis on a fork 70 having a threaded extension 72 provided with an elongated slot in an upper part thereof, as viewed in Figure 7. The sleeve 54 is internally threaded and mates with the threads of extension 72, this sleeve 54 being mounted for turning movement on the fixed supports 73 and 74 and being formed with a grooved wheel over which the cable 53 is guided. The support 73 carries a pin 75 extending into the groove in the threaded portion 72 of fork 70, so that upon rotation of sleeve 54 by movement of cable 53, the extension 72 of fork 70 will be moved in translation to carry member 55 in translation with the same. Thus, when the sleeve 54 is rotated, the members 67 and 67b will move in translation with the fork 70 and will cause the bell cranks 49 and 49b to turn in the same direction so that members 34 and 34b will move in opposite directions to cause the propellers 50 and 50b to incline in opposite directions. On the other hand, when the member 55 is turned about its central axis through the medium of member 48, the members 67 and 67b will move in opposite directions and cause the propellers 50 and 50b to tilt in the same direction. The three arm lever 66 is mounted, in exactly the same way as that illustrated in Figure 7, on a fork 71 which is moved in translation by movement of the cable 58 over the turnable sleeve 59 which is associated with a threaded portion of fork 71 in the same way that sleeve 54 is associated with the fork 70, the forks 70 and 71 being of the same construction and the sleeves 54 and 59 being of the same construction.

The system of Figure 5 operates as follows:

Movement of the control column 42 in the pitching plane not only moves the elevators 45, but moves the bell-crank 47 and link 48 to rock the bell-crank 55 on its pivot and thereby moves the links 67, 67b, bell-cranks 49, 49b and rods 34, 34b to incline the discs of both propellers 50, 50b equally in the same sense as the control column is moved i.e. nose-down for forward movement of the control column and conversely.

It will be seen by inspection of Figure 2 that the angular shift of the thrust vectors thus produced creates a pitching moment about the C.G. of the aircraft in the required sense.

When the rudder pedals 44, 44b are moved to deflect the rudder, the loop 53 rotates the sleeve 54 (Figure 5), and thereby shifts the fork 70 and the bell-crank 55.

This shifting movement of bell-crank 55 to the right or left as viewed in Figure 7, is transmitted to the links 67, 67b and bell-cranks 49, 49b and causes the rods 34, 34b to move in opposite directions, thereby inclining the discs of propellers 50, 50b differentially in the pitching plane of the aircraft; and the "hand" of the thread of sleeve 54 is such that when the pedals 44, 44b are moved to steer to port the disc of the port propeller 50 will be inclined backwards, i.e. nose-up, and that of the starboard propeller 50b forwards, i.e. nose-down, and conversely.

It will at once be evident that the consequent differential inclination of the propeller thrust vectors produces a yawing moment in the required sense, accompanied by a rolling moment; but the differential change in the aerodynamic reactions on the parts of the fixed wing immersed in the slipstreams of the two propellers, consequent on the differential change of their angles of attack with respect to the slipstreams are such that the rolling moment of the wing system tends to oppose that of the propeller-thrusts, while the wing moment, if opposed to the propeller-thrust yawing moment, is not so powerful.

Movement of the "wheel" 43 in the rolling plane not only operates the ailerons 56, 56b, but causes the loop 58 to rotate the nut 59, which by its engagement with the threaded shank of fork 71 displaces the latter axially and bodily displaces bell-crank 66, and this movement, transmitted by links 60, 60b, and bell-cranks 61, 61b causes the rods 36a to be moved differentially; and the "hand" of the thread of nut 59 is such that clockwise movement of wheel 43 (as seen in Figure 5) causes the pitch of propeller 62 to increase and that of the propeller 62b to decrease. The effect of this is to increase the thrust and consequently the aerodynamic reaction of the slipstream-immersed wing on the side at which the propeller pitch is increased and decrease them on the opposite side. The increments (positive or negative) of the horizontal components of thrust and wing reaction (drag) oppose one another and consequently little or no yawing moment is created, but their vertical components both act upwards and supplement each other, the attitude of the aircraft being as shown in Figure 2, so that the total upward force is increased on the side at which the propeller pitch is increased and decreased on the opposite side, thus creating a rolling moment in the desired sense.

If desired, differential pitch variation for rolling control may be applied to all four propellers of the arrangement shown in Figure 5, to accomplish which the member 71, whose threaded shank is engaged by nut 59, may have a second fork in which bell-crank 65 is pivoted.

Preferably, controllable means, as shown in Figure 8, are provided for disconnecting the controls of the propellers from the pitching, rolling and yawing control circuits.

Referring to Figure 8, it will be seen that the three armed member 55 is mounted on the fork 70, as is illustrated in Figures 5 and 7. The pitch control member, operated by the pilot and not shown in Figure 8, actuates the linkage 46, as is described above. To this linkage there is connected a three arm lever 76 which actuates the lever 78 by means of the cables 77 and 77b. This lever 78 controls the same member 48 which actuates the three arm lever 55 to turn the same. The cables 77 and 77b pass over the pulleys 79, 79a and 80, 80a, respectively, these latter four pulleys having fixed axes of rotation. As is shown in Figure 8, the cables 77 and 77b also pass over the pulleys 81 and 81a, respectively, which are mounted on members 82 and 82a, respectively, the latter being linked to the lever 83 which is turnable about its center. This lever 83 is in a position to be immobilized by the cams 84 and 84a which are fixedly connected to a shaft 86 which is turned through the medium of link 85 by a control rod 87 accessible to the pilot of the aircraft. Thus, when the cams 84 and 84a are in the position shown in Figure 8, the member 83 cannot turn and the pulleys 81 and 81a are thereby maintained in a fixed position which results in transmitting the movements of linkage 46 to member 55. However, when the rod 87 is actuated to move the operative edges of cams 84 and 84a away from member 83, the latter is free to turn and all movement of member 76 resulting from movement of linkage 46 will simply cause the member 83 to turn and will not cause any movement in member 78 or member 48. Similar structures are illustrated in Figure 8 in association with the rudder and aileron control parts, so that these also may be connected and disconnected in the same way from the pilot's control. This application is a continuation-in-part of U.S. patent application S.N. 208,797, filed January 31, 1951, entitled "Aircraft," and now abandoned.

I claim:

1. An aircraft comprising, in combination, a fuselage having a nose end and an empennage; a wing fixedly mounted on said fuselage at each side thereof and between said nose end thereof and said empennage; trailing flap means for deflecting the slipstream downwardly before it reaches said empennage, said trailing flap means being connected to the trailing edge of said wing for turning movement with respect thereto into and out of a position extending downwardly from said wing in a plane extending spanwise and being substantially normal to the longitudinal, central axis of said fuselage; an even number of propellers symmetrically located on the aircraft in front of and at substantially the same elevation as said wing so that the slipstream from said propellers covers a major part of said wing and so that said trailing flap means, when it is in said position thereof, directs the slipstream downwardly along a path which avoids said empennage; conventional operating means located in the aircraft for operating the same; tilting means operatively connected to each of a pair of symmetrically arranged propellers for tilting the swept discs thereof about a tilting axis substantially at the elevation of said wing, parallel to the pitching axis of the aircraft and located at a substantial distance ahead of the center of gravity of the aircraft; control means operatively connected to said tilting means for controlling the inclination of said pair of propellers; elevators and a rudder forming part of the aircraft; and connecting means interconnecting said control means with the operating means for said elevators and rudder for actuating said control means to operate said tilting means to tilt said pair of propellers in the same direction when said elevators are operated and to operate said tilting means to tilt said pair of propellers in different directions when said rudder is operated.

2. An aircraft as recited in claim 1 and wherein each of said propellers has an axis of rotation which forwardly of said tilting axis is directed upwardly with respect to the longitudinal axis of the fuselage of the aircraft.

3. An aircraft as recited in claim 1 and wherein said tilting axis is located ahead of the center of gravity of the aircraft by a distance at least as great as 80% of the mean chord of the wing.

4. An aircraft as recited in claim 1 and wherein said aircraft includes aileron means for controlling the roll of the aircraft; a pilot's control member forming part of said conventional operating means and operatively connected to said aileron means for operating the same; blade pitch control means operatively connected to each of said propellers for adjusting the blade pitch thereof; and connecting means interconnecting said blade pitch control means and said pilot's control member for differentially varying the blade pitches of a left and right symmetrically arranged pair of propellers so that movement of said pilot's control member in a sense to cause a roll to the left causes the blade pitch of the left one of said propellers to decrease relative to the blade pitch of the right one of said propellers, and conversely.

5. An aircraft as recited in claim 1 and wherein said tilting means includes a cyclic pitch control mechanism for cyclically varying the pitch of said pair of propellers.

6. An aircraft as recited in claim 5 and wherein each of said propellers comprises a limb and blades, and said cyclic pitch control mechanism including a swashplate located behind each propeller concentrically with the propeller axis and mounted for axial displacement with respect to the propeller axis and for rocking movement about an axis normal to the propeller axis, a lever fixed to each propeller blade, a link connecting said lever with said swashplate, a linkage operatively connected to said swashplate, a first control member operatively connected to said linkage for rocking said swashplate, about said axis normal to said propeller axis, and a second control member operatively connected to said linkage for axially displacing said swashplate.

7. An aircraft as recited in claim 1 and wherein a frame means is fixed to said fuselage and supports each of said propellers, said frame means having at its front end a forwardly extending support; said tilting means including a ring turnably carried by said support for movement about said tilting axis and a ball bearing located at the inner periphery of said ring, the propeller which is supported by said frame means having a hub turnably supported by said ball bearing and extending therefrom, and said tilting means further including a control rod means extending through said frame means and forwardly beyond the same, a projection extending from said ring and pivotally connected to said rod means so that the latter may be actuated to tilt said propeller; and a drive means located in said frame means and extending along the axis of said ring for transmitting a drive to said hub for turning the latter.

8. An aircraft as recited in claim 1 and wherein a frame means is fixed to said fuselage and supports each of said propellers, each propeller having a hub located forwardly of said frame means and being rotatable with respect thereto; support means supporting said hub for tilting movement about said tilting axis; a control rod forming part of said tilting means and operatively connected to said support means for tilting said hub; drive means located in said frame means and extending forwardly beyond the same to transmit a drive to said hub, said drive means including a driveshaft having a forward free end located forwardly beyond said frame means, and a universal joint located on the axis of said hub and connected to said hub and forward end of said drive shaft for transmitting the drive from said shaft to said hub.

9. An aircraft as recited in claim 1 and wherein the center of gravity of the aircraft is located within a sector included between the limits of a maximum angle through said propellers can be tilted by said tilting means.

References Cited in the file of this patent

UNITED STATES PATENTS

| | | |
|---|---|---|
| 1,366,262 | Jossenberger | Jan. 18, 1921 |
| 1,432,445 | Earl | Oct. 17, 1922 |
| 1,670,923 | Arnold | May 22, 1928 |
| 1,933,307 | Bolas | Oct. 31, 1933 |
| 2,280,654 | Mader | Apr. 21, 1942 |
| 2,478,847 | Stuart | Aug. 9, 1949 |

FOREIGN PATENTS

| | | |
|---|---|---|
| 345,910 | Great Britain | Apr. 2, 1931 |
| 723,035 | Germany | July 27, 1942 |